United States Patent [19]

Ohtaki et al.

[11] 4,181,416
[45] Jan. 1, 1980

[54] DATA PRINTER FOR A CAMERA

[75] Inventors: Syohei Ohtaki, Yokohama; Keiko Kondo, Tokyo; Zenzo Nakamura, Urawa; Youichi Okuno, Yokohama, all of Japan

[73] Assignee: Canon Kabushiki Kaisha, Tokyo, Japan

[21] Appl. No.: 731,941

[22] Filed: Oct. 13, 1976

[30] Foreign Application Priority Data

| Oct. 14, 1975 [JP] | Japan | 50-123608 |
| Nov. 6, 1975 [JP] | Japan | 50-133307 |
| Dec. 17, 1975 [JP] | Japan | 50-151144 |

[51] Int. Cl.² .............. G03B 12/24; G03B 15/05
[52] U.S. Cl. .................... 354/106; 315/136; 315/241 P
[58] Field of Search .............. 354/105–109, 354/60 E, 60 L, 127, 128, 145, 34, 139, 146, 147, 149; 315/129, 241 P, 136; 340/253 R

[56] References Cited

U.S. PATENT DOCUMENTS

| 2,943,542 | 7/1960 | Bloomfield | 354/107 |
| 3,626,401 | 3/1969 | Flieder | 315/129 X |
| 3,764,849 | 10/1973 | Ohta | 315/241 P |
| 3,906,523 | 9/1975 | Ogiso et al. | 354/109 |
| 3,969,737 | 7/1976 | Kendrick | 354/145 X |
| 3,971,049 | 7/1976 | Ohmori et al. | 354/105 X |

*Primary Examiner*—L. T. Hix
*Assistant Examiner*—William B. Perkey
*Attorney, Agent, or Firm*—Toren, McGeady and Stanger

[57] ABSTRACT

A photographic data recording device for a camera for photographically recording some data on film together with a photographic image. The device includes a capacitor, a charging circuit for the capacitor which responds to the release of the shutter for commencing charging and an electronic flash device operating in response to the capacitor discharge to illuminate the data. A control device automatically causes the capacitor to discharge electricity to allow the electronic flash device to emit a flash when the charge of the capacitor reaches a preset level of potential and which prevents the capacitor from discharging when the charge is below the preset level of potential. A display lamp may be utilized to indicate when the charged voltage of the capacitor reaches a preset level.

2 Claims, 8 Drawing Figures

DATA PRINTER FOR A CAMERA

This invention relates to photographic cameras, and more particularly to a data printer of a camera with a chamber provided in its back cover for accommodating a number of indicium carriers and an illumination light source to make a data exposure on the associated film from the back surface thereof.

It is known to provide a data printer in which a data exposure which may be of a date and the like related to a concurrent picture exposure is made on an adjacent film area from the back surface of the film, as, for example, disclosed in Japanese Utility Model Publication No. Sho 48-4892. This data printer, however, necessitates a lens for projecting an image of the data onto the film which in turn calls for an increase in backward extension of the camera housing, as a chamber accommodating the data printer is provided in the back cover, whereby camera handling difficulties are introduced.

The displacement of such projection lens by a linear arrangement of a number of indicium-carrying disks has been proposed in Japanese Utility Model Laid-Open Specification No. Sho 49-19726. With this arrangement, however, as the number of indicia to be printed is increased, it is required to increase the size of a chamber necessary to accommodate the corresponding number of indicium carrying disks as arranged along the longitudinal length of the film frame.

With the foregoing in mind, it is a primary object of the present invention to provide an improved data printer with limitation of the overall dimensions to a minimum.

Briefly, this is achieved by arranging a necessary number of indicium carrying disks in concentrically superimposed relation to each other. Each of the disks has two distinct circular sections one of which is of a regulated density serving as a filter for flash illumination level control and another section which carries a series of indicium characters in the transparent form on the opaque background. This opaque section is so dimensioned that upon concentric superimposition of all the disks, the respective series of indicium characters are radially spaced from each other to enable the operator to select different combinations of indicia in a radial alignment.

A concomitant object of the invention is to assure a greatly increased reliability of operation for data exposure in uniformity from frame to frame with variation of flash lighting level dependent upon the sensitivity of the used film and to provide some means for monitoring whether or not the flash lamp has been fired.

In accordance with the invention, a photographic data recording device for a camera for photographically recording some data on film together with a photographic image includes a capacitor, electric charging means which responds to shutter release for commencing electric charging and electronic light flashing means which emits a flash light in response to electric discharge by said capacitor to illuminate the data at an intensity corresponding to the electric charge potential of the capacitor. Also included are controlling means which automatically causes said capacitor to discharge electricity to allow the electronic light flashing means to emit a flash light when electric charge in the capacitor reaches a preset level of electric potential and which prevents the capacitor from discharging electricity when the electric charge is below the preset level of potential.

In one form of the invention, the photographic data recording device includes a capacitor, charging means and electronic light flashing means as above and also trigger means for causing the capacitor to discharge electricity for allowing the electronic light flashing means to emit the flash of light in response to shutter release including a trigger capacitor. Further, a display lamp and switching means are included. The display lamp lights up when the charged voltage of the capacitor reaches a preset value and the switching means shifts the capacitor charging means between an operative position and an inoperative position. The switching means are arranged to short circuit the trigger capacitor and display lamp to put out the display lamp when the switching means are at the inoperative position. The capacitor is rendered incapable of causing the electronic light flashing means to emit a flash of light to prevent, irrespective of shutter release, the data from being illuminated by erroneous emission of a flash of light by the light flashing means in cases where the data are not required to be inserted into a photograph being taken.

The present invention will be further described in detail by reference to the accompanying drawings in which.

Figure 1:
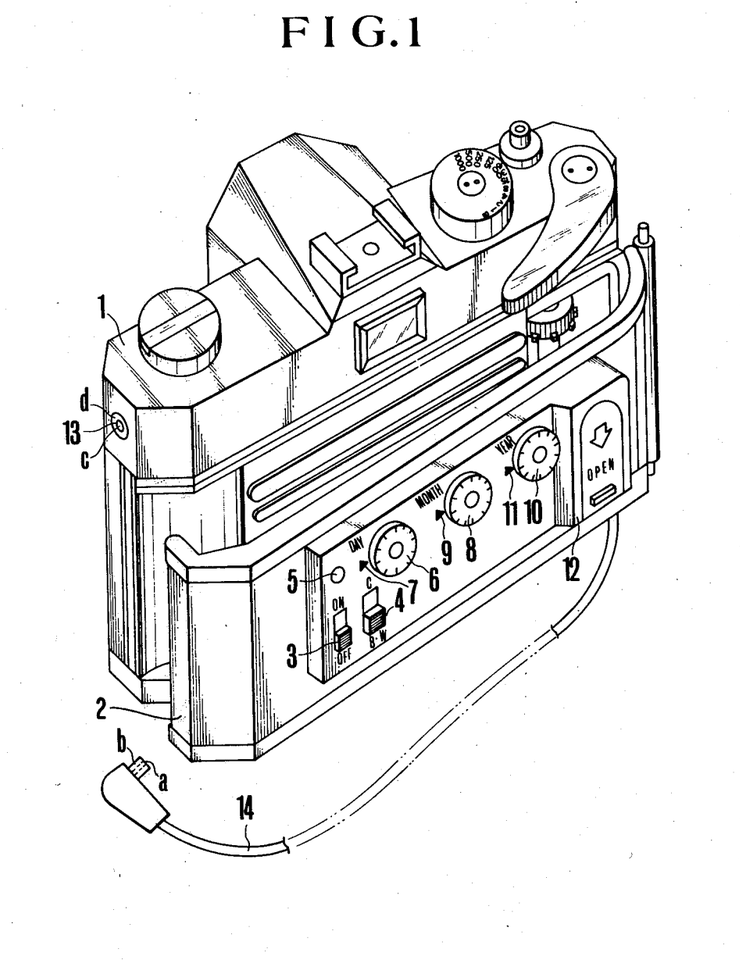
FIG. 1 is a perspective view of a single lens reflex camera with its interchangeable back cover carrying a data printer of the present invention.

Referring to FIGS. 1 to 5, there is shown one embodiment of a data printer according to the present invention adapted to record a date with year, month and day related to a picture exposure made on the film used in a single lens reflex camera. This camera has a body 1 provided with an ordinary back cover not shown interchangeable with the one 2 having incorporated on the inside thereof the data printer as shown in FIG. 1. The back cover 2 has a main switch 3, an exposure value selector 4, an indicator window 5, a day setting dial 6 cooperative with a stationary index 7, a month setting dial 8 with a stationary index 9 therefor, a year setting dial 10 with a stationary index 11 therefor, a battery container 12, and a data exposure initiating switch cord 14 having a pair of interconnection terminals "a" and "b" adapted for connection with respective interconnection terminals "c" and "d" of a synchro-switch not shown provided in the camera body 1.

Figure 2:
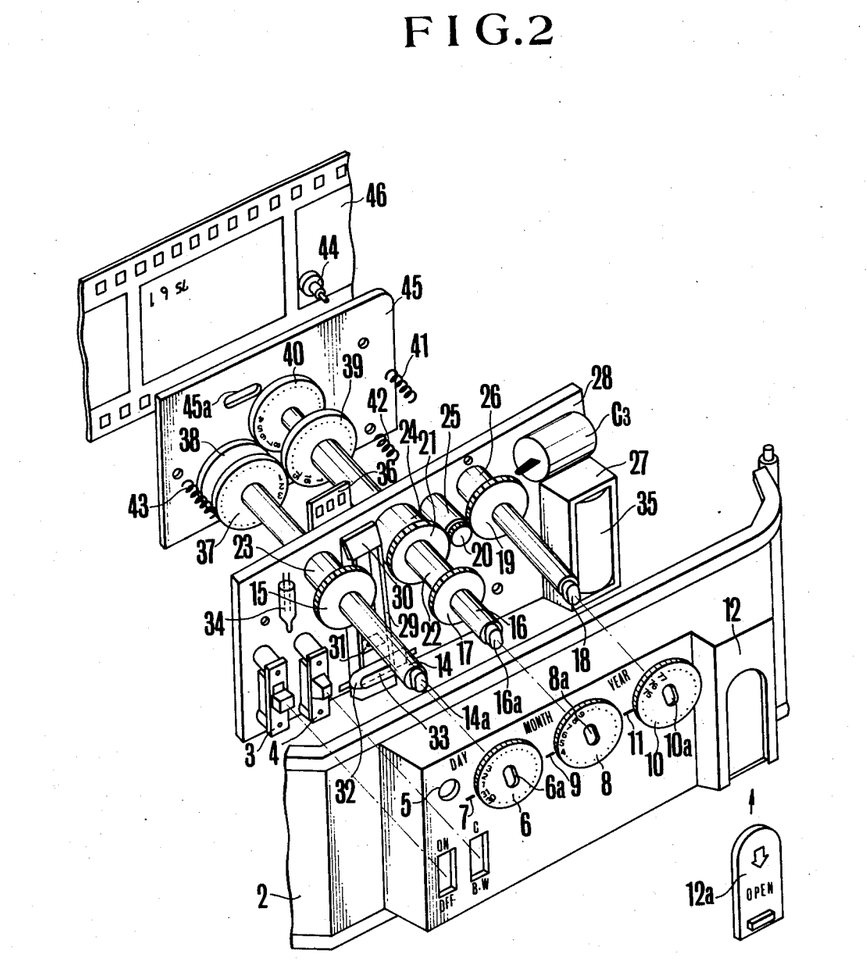
FIG. 2 is an exploded perspective view of the basic parts of the data printer of FIG. 1.
Figure 3:
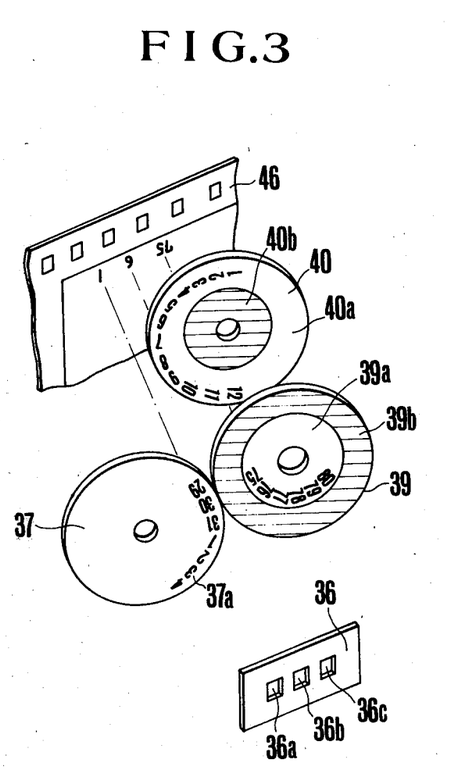
FIG. 3 is a fragmentary exploded perspective view on enlarged scale showing relative structures of the indicium carrying disks of FIG. 2.
Figure 4:
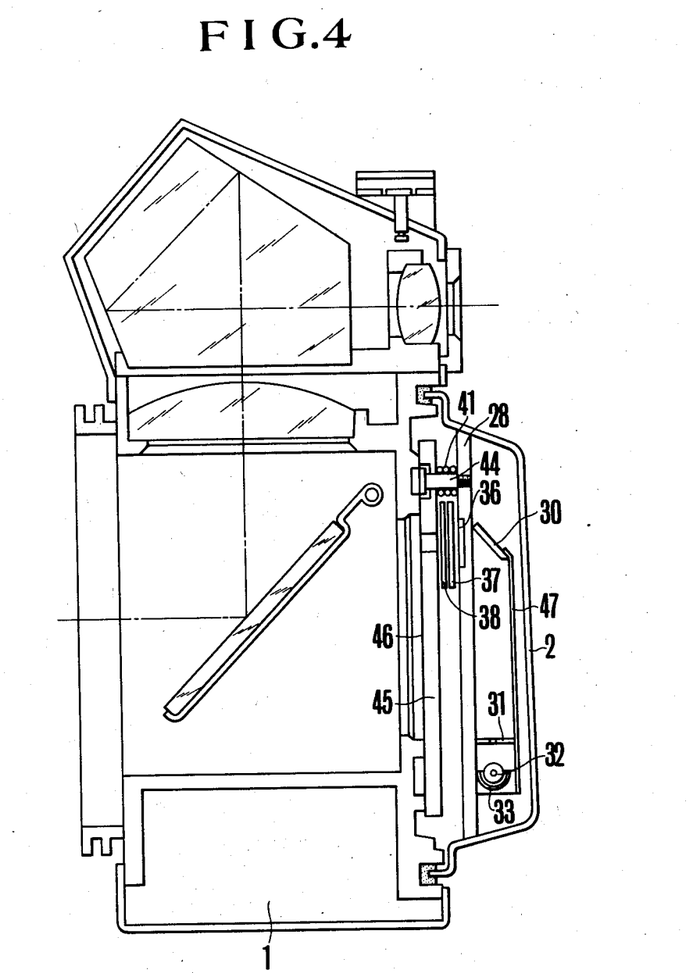
FIG. 4 is a vertical sectional view of the camera of FIG. 1 with the data printer being in the operative position.

FIG. 2 shows the details of the construction and arrangement of the basic parts of the data printer of the invention. The data printer includes a first click stop gear 15 affixed to a shaft 14 near the center thereof, the shaft 14 being movable in a bearing 23 and fixedly carrying the day setting dial 6 at one end 14a thereof, the opposite end of which fixedly carries a disk 37 having a series of indicia, in this instance, numeral characters "1" to "31" in the transparent form on the opaque background, and having a ND filter 38, a second click stop gear 17 affixed to a shaft 16, the shaft 16 carrying the month setting dial 8 at one end 16a thereof, the opposite end of which fixedly carries a disk 40 having a series of indicia, in this instance, numeral characters "1" to "12" distributed in the transparent form on an annular opaque track 40a (see FIG. 3) and a third click stop gear 19 affixed to a shaft 18, the shaft 18 carrying the year setting dial 10 at one end 18a thereof, the opposite end of which is supported in a bearing 26. Motion of the gear 19 is transmitted through a pinion 20 of which the shaft is supported in a bearing 25 to a gear 21 affixed to a hollow shaft 22 rotatable between the shaft 16 and a bearing 24 and carrying a disk 39 having a series of indicia, in this instance, numeral characters, "75", "76", and so on at the rear end thereof, whereby the month and year disks 40 and 39 respectively are arranged in concentrically superimposed relation to each other. The shaft bearings 23, 24, 25 and 26 are fixedly mounted in a common support plate 28 on which is also provided a battery chamber 27 accommodating a battery 35. Positioned between the bearings 23 and 24 on the back side of the support plate 28 is a flash light guide box 29 containing a reflecting mirror 30, an apertured diaphragm 31, a flash lamp 32 and a semi-cylindrical reflector 33 arranged in concentric relation to the flash lamp 32. Flash light from the fired flash lamp 32 passes through a very small opening of the apertured diaphragm 31 to the reflecting mirror 30 and therefrom reflected in a direction perpendicular to the film plane as shown in FIG. 4.

Positioned between the illuminating mirror 30 and a photographic film 46 is a system for forming an image of data within a lower longitudinal margin of a film frame area on which a picture exposure produced by the objective lens of the camera is to be made. The system comprises a ghost preventing mask 36 mounted in a cutout provided through the support plate 28 and having three rectangular windows 36a, 36b and 36c arranged along a common longitudinal line as shown in FIG. 3, the three date character carrying disks 37, 39 and 40 arranged between the ghost mask 36 and a slot 45a provided through a film presser 45 so that upon setting of day, month and year on the respective dials 6, 8 and 10 in registry with their respective indexes 7, 9 and 11, a combination of the corresponding numeral characters is selected for alignment with the respective windows 36a, 36b and 36c. As shown in FIG. 3, the day numeral character 37a—carrying disk 37 is positioned in peripheral edge-by-edge relation to the year numeral character 39a—carrying disk 39 having a circumferencial annular zone 39b of low density behind which is positioned the month numeral character 40a—carrying disk 40 in concentric relation to the disk 39 so that an opaque annular zone having the transparent numeral characters 40a and a central portion 40b of low density overlap the annular and central zones 39a and 39b of the disk 39 respectively. Each of these disks 37, 39 and 40 may be manufactured by photographic techniques, for example, from photographic film. The data image forming system is compacted between the support plate 28 and the film presser plate 45, the latter being resiliently secured to the former by means of compressed springs 41, 42 and 43 surrounding respective screws 44 fixedly connected to the support plate 28, as shown in FIG. 4, whereby a minimized backward extension of the back cover 2 of the camera 1 is achieved as compared with the prior art. The light guide box 29 of FIG. 2 is shown with its back panel 47 of FIG. 4 removed.

Figure 5:
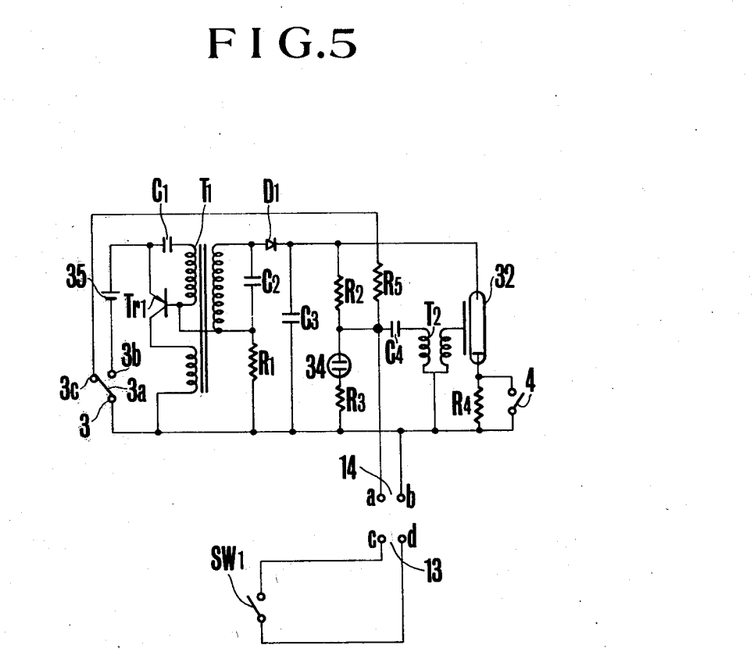
FIG. 5 is a circuit diagram of an example of a flash lighting device usuable as an illumination light source of the data printer of FIGS. 1 to 4.

FIG. 5 shows an example of the flash lamp 32 firing circuit usuable with the data printer of the type described. The firing circuit comprises the aforesaid battery 35, a PNP type transistor Tr1 having an emitter electrode connected to the positive terminal of the battery 35 and having a collector electrode connected through one of two primary coils of a transformer T1 to a movable contact 3a of the main switch 3 of FIG. 1 with one of two fixed contacts 3b and 3c, namely, 3b, being connected to the negative terminal of the battery 35, the other primary coil of the transformer T1 being connected between the emitter and base electrodes of the transistor Tr1 through a capacitor C1, and these parts Tr1, C1 and T1 constituting a conventional converter circuit, a smoothing capacitor C2 connected between the ends of a secondary coil of the transformer T1, a resistor R1 connected between the capacitor C1 and the movable contact 3a of the switch 3 or the negative bus, a rectifying diode D1 having an anode connected to the secondary coil of the transformer T1, a flash energy storage capacitor C3 connected between the cathode of the diode D1 and the negative bus, the aforesaid flash lamp 32 connected across the storage capacitor C3 so that voltage stored on the capacitor C3 appears across the lamp 32, a detecting circuit for detecting the voltage stored on the capacitor C3 comprising a resistor R2, the aforesaid neon tube 34 of FIG. 1, and a resistor R3 connected in series with each other in this order between the positive and negative bus, and a trigger circuit comprising a transformer T2 having a primary coil connected at one end through a capacitor C4 to a junction between the resistor R2 and the neon tube 34 and having a secondary coil connected at one end to the trigger electrode of the flash lamp 32. In order to control the discharge current of the flash lamp 32, there is provided a resistor R4 and the aforesaid switch 4 connected in parallel with each other in the discharge circuit of the lamp 32. In order to initiate operation of the trigger circuit T2, C4, there is utilized the synchro-switch SW1 provided in the camera body 1 of FIG. 1 having the pair of interconnection terminals "c" and "d" arranged to be connectable with the pair of interconnection terminals "a" and "b" respectively of the cord 14 of FIG. 1 and connected to a junction between the resistor R2 and the capacitor C4 and to the negative bus respectively. This junction is connected by way of a lead through a resistor R5 to the fixed contact 3c of the main switch 3.

The operation of the data printer of FIGS. 1 to 5 is as follows. Before making an exposure of an image or photographic film 46 on a certain day, the photographer may turn the day dial 6 and in some cases the month and year dials 8 and 10 to place respective graduations representing in combination the corresponding date in registry with the respective stationary indexes 7, 9 and 11. As the day dial 6 is turned to the final position, the disk 37 is turned by the shaft 14 to bring the one of the series of numeral characters 37a which corresponds to the identified day into registry with the ghost mask window 36a and also with the printing slot 45a. As the month dial 8 is turned to the final position, the disk 40 is turned by the shaft 16 independently of the hollow shaft 22 to bring the one of the series of numeral characters 40a which corresponds to a month of the day into registry with the ghost mask window 36b and also with the printing slot 45a. As the year dial 10 is turned to the final position, the motion of the dial 10 is transmitted through the shaft 18, third click stop gear 19, pinion 20 and gear 21 to the hollow shaft 22, so that the disk 39 is turned by the shaft 22 to bring the one of the series of numeral characters which corresponds to a year of the day into registry with the ghost mask window 36c and also with the slot 45a without causing introduction of motion to the month disk 40 as the shaft 16 carrying the disk 40 is secured in position by a click mechanism not shown with the second click stop gear 17.

Thereafter, when the main switch 3 is thrown into its "on" position where the movable contact 3a is in contact with the fixed contact 3b, the converter circuit begins to oscillate, causing initiation of charging of the storage capacitor C3. When the voltage stored on the capacitor C3 has reached a predetermined level higher than the breakdown voltage of the flash lamp 32, the neon tube 34 is lighted up so that the photographer locking at the window 5 is informed of the fact that the flash lamp 32 is ready to fire with a sufficient voltage. If the film used in the camera is either of color or of black-and-white, the switch 4 is thrown into its "C" or its "BW" positions in which the switch 4 is closed, or open respectively.

To make an exposure of the film 46 in one frame, the photographer may depress a shutter release button not shown to close the synchro-switch SW1 at the exposure aperture full open position, thereupon the flash lamp 32 is striked to fire. Flash light emitted from the fired lamp 32 passes through the small opening of the apertured diaphragm 31 to the mirror 30 inclined at an angle of 45° with respect to the axis of the flash light path in the box 29, and therefore reflected therefrom to enter all the ghost mask windows 36a, 36b and 36c to illuminate all the disks 37, 39 and 40 at their respective registered numeral characters. Light from the transparent character on the day disk 37 is radiated forward through the filter disk 38 and the slot 45a onto the upper left corner of the film frame area where an image of the turned numeral character is formed as viewed in FIGS. 2 and 3. Light from the transparent character on the year disk 39 is radiated forwards through the central filter portion of the month disk 40 and the slot 45b onto the upper margin of the film frame area where an image of the turned numeral character is formed in longitudinal alignment with the day character image. As the illuminating light entering through the central window 36b passes through the annular filter zone of the year disk 39, the level of luminance of the month character image between the day and year character images is made equal to that of luminance of the latter two images.

As the charge on the storage capacitor C3 is discharged through the flash lamp 32, the voltage of the capacitor C3 rapidly drops so that the neon tube 34 connected in parallel to the storage capacitor C3 is lighted off as soon as the termination of firing the flash lamp 32, whereby the photographer is informed of the fact that the data exposure has been completed.

When the main switch 3 is thrown to its "OFF" position, the charge once stored on the trigger capacitor C4 is leaked out through the resistor R5 so that the closure of the synchro-switch SW1 does not result in the firing of the flash lamp 32.

In the above-described embodiment of the present invention, the day indicium carrying disk 37 and the year indicium carrying disk 39 are shown as arranged in peripheral edge-by-edge relation to each other along a common longitudinal line, but these disks 37 and 39 may be arranged in concentrically superimposed relation to each other and also to the month indicium carrying disk 40. If so, a further shortening of the data printer in the longitudinal direction of the film can be achieved. It will be appreciated from the foregoing that the described embodiment accomplishes the primary object of the present invention. An advantage deriving from no necessity of using a data image forming lens is that it is made ease for the photographer to handle the camera while looking through the view finger, and further that the portability of the camera is provided.

The flash lamp firing circuit of FIG. 5 is shown as provided with a neon tube so that when the voltage stored on the storage capacitor has reached the predetermined level, the neon tube is lighted on to indicate that the flash lamp is ready to fire, while when the neon tube is lighted off at the termination of firing of the flash lamp, it is indicated that the operation has been completed. As far as the illumination light source of the data printer of the camera is concerned, however, a flash lamp of extremely small capacity may be selected for employment as the light source, and therefore a storage capacitor of small capacitance may be selected. Accordingly, the time period of one cycle of a charging followed by a discharging of the storage capacitor becomes very short (on the order of a few milliseconds), and the time interval during which the neon tube is lighted on is made small so that there is some disadvantage to the use of the neon tube as the monitoring means for the data exposure operation.

Figure 6:
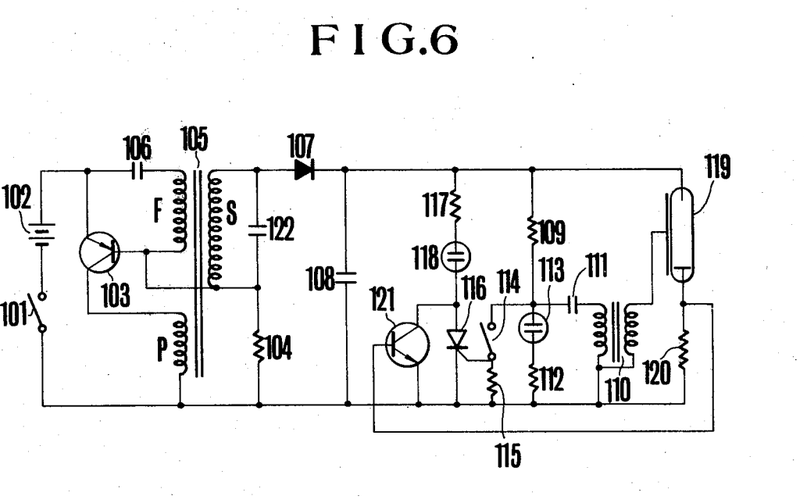
FIG. 6 is a similar circuit diagram showing another example of the device.

FIG. 6 shows another example of the flash lamp firing circuit provided with an additional warning lamp which continues to light up when the date exposure operation is hindered to proceed by some reasons. In the figure, 101 is a power switch; 102 is a power source battery; 103 to 106 are elements constituting a DC boosting circuit of the transistorized oscillation type. 107 is a rectifying diode; 108 is a main capacitor. The above-described circuit is similar to that employed in the conventional stroboscopic unit for flash photography. In the case of the data printer, this circuit may be constructed from the corresponding elements but of small capacities so that the time period during which the main capacitor 108 is charged to the breakdown voltage level for the flash lamp becomes very short as compared with the speed light unit for usual photographic purposes. Next, 109, 110 and 111 are elements constituting a trigger circuit for the flash lamp 119; 112, 113 are a resistor and a neon tube respectively, of a display circuit for indicating that the lamp 119 is ready to fire. In other words, at a time of simultaneous occurrence of the facts that the chargings of the main capacitor 108 and the trigger capacitor 111 are completed, a lamp 113 is lighted up to indicate that the lamp 119 is ready to fire. 114 is a trigger switch arranged to be closed when a shutter release button of the camera is depressed. 115, 116, 117 and 118 are elements constituting a display circuit for indicating whether or not the data printing operation is effected. 120 is a resistor connected in series to the discharge tube 119; 121 is a switching transistor; and 122 is a protecting capacitor of the DC boosting circuit.

Next, the operation of the circuit of FIG. 6 is explained. When the power switch 1 is closed, the low voltage of the battery 102 is converted to a high voltage alternating current by the DC boosting circuit at the secondary coil of the transformer 105. This alternating current is half wave rectified to charge the main capacitor 108 and the trigger capacitor 111. When the voltages on the main capacitor 108 and trigger capacitor 111 have reached respective levels for satisfactory firing of the discharge lamp 119, the neon tube 113 is lighted on, as a current is allowed to flow through the circuit comprising resistors 109 and 112 and the neon tube 113. At this time, when the switch 114 is closed in synchronism with the depression of the shutter release button of the camera, the charge on the trigger capacitor 111 is pulsated through the primary coil of the trigger transformer 110, so that a high voltage pulse appears across the secondary coil of the transformer 110 to strike the strobo discharge tube 119. As the charge on the main capacitor 108 is discharged through the lamp 119, flash light is emitted to make a data exposure, and a voltage appears across the resistor 120 connected in the discharge circuit of the lamp 119, which is applied to the base of the transistor 121. On the other hand, the control electrode of the thyristor 116 is made positive potential by a current flowing through the resistor 115 from the trigger circuit. As the both electrodes of the thyristor 116 are short-circuited by the turning-on of the transistor 121, however, at the termination of firing of the stroboscopic discharge tube, both of the thyristor 116 and the transistor 121 are rendered non-conducting. Therefore, in this state, no current flows through the resistor 117 and the neon tube 118 so that the neon lamp 118 is OFF, thereby it is possible to recognize that the strobo has been operated to fire. In other words, no light from the display lamp 118 leads to the recognition of the fact that a normal data exposure operation has been performed.

If the strobo was not made to fire by some reason in response to the shutter release of the camera, no discharge current flows through the lamp 119 and therefore no voltage is produced across the resistor 120, so that the transistor 121 is OFF. The thyristor 116 is turned on by the closure of the trigger switch 114. Therefore, a current flows through the resistor 117, neon lamp 118 and thyristor 116 so that the display lamp 118 is lighted up. The thyristor 116 continues to hold its ON state so that the lighting of the display lamp 118 is maintained to indicate that no data exposure operation was performed in response to the shutter release.

As shown above, according to the data exposure failure displaying method of the present invention, when the illumination light source of the data printer is not made energized, the photographer is immediately made aware of the failure of a data exposure operation during the making of a picture exposure before the exposed film is subjected to processing.

Figure 7:
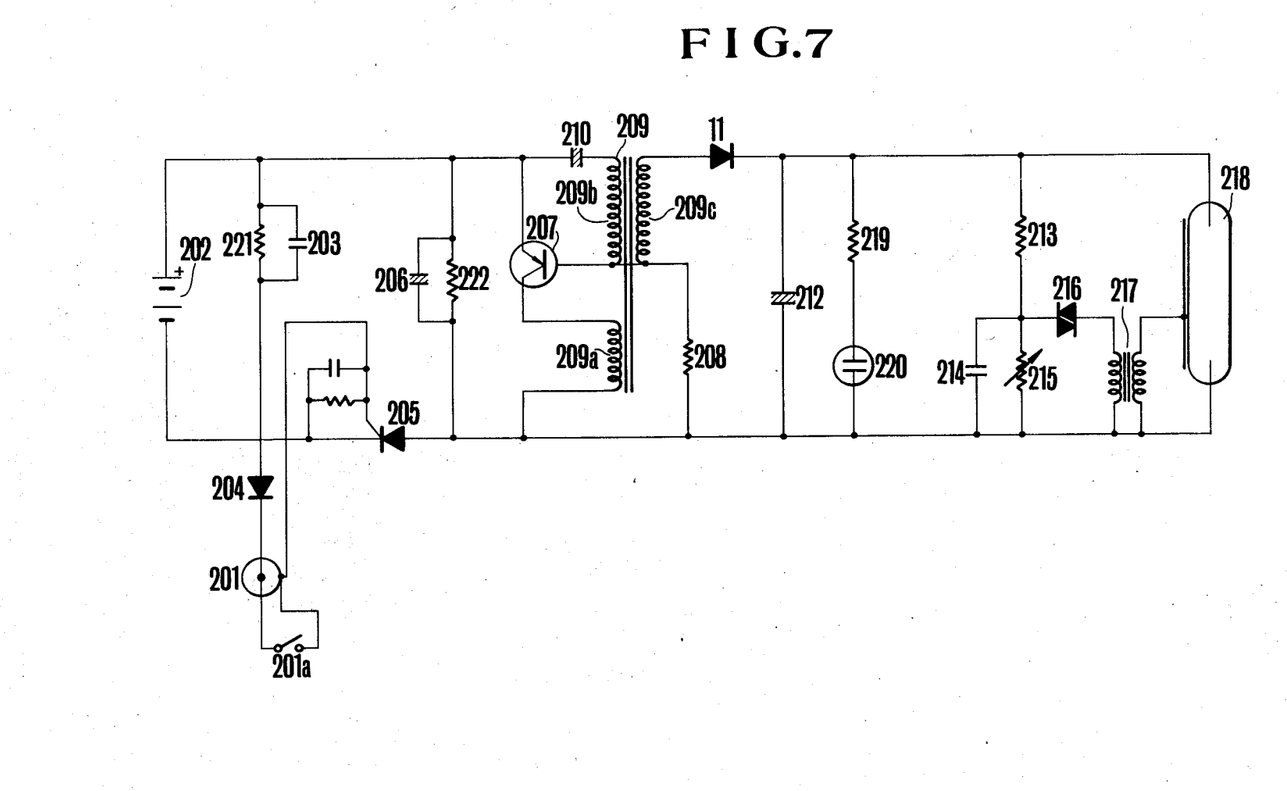
FIG. 7 is a similar circuit diagram showing still another example of the device.

FIG. 7 shows still another example of the flash lamp firing circuit adapted for use in the data printer of the present invention, which is different from the circuit of FIG. 6, in that during the making of a picture exposure, a flash lamp as the illumination light source is striked to fire without failure at a time when a sufficient voltage becomes available to fire the flash lamp, as a time variable voltage of the storage capacitor reaches the above-identified sufficient voltage level during an interval of time after the camera shutter is opened to close the synchro-switch. To achieve this, the synchro-switch 201a provided in the camera is utilized to control the gating operation of a thyristor 205 connected in a power supply circuit for a converter (207, 208, 209, 210), a storage capacitor 212, a striking circuit (213, 214, 215, 216, 217) and the flash lamp 218. Now assuming that the back cover 2 carrying the data printer of the invention is assembled with the camera body 2 while establishing the electrical connection to the synchro-switch 201a at the interconnection terminal 201 as shown in FIG. 7, the gating control electrode of thyristor 205 is connected through a diode 204 and a resistor 221 to the positive terminal of a battery 202.

Figure 8:
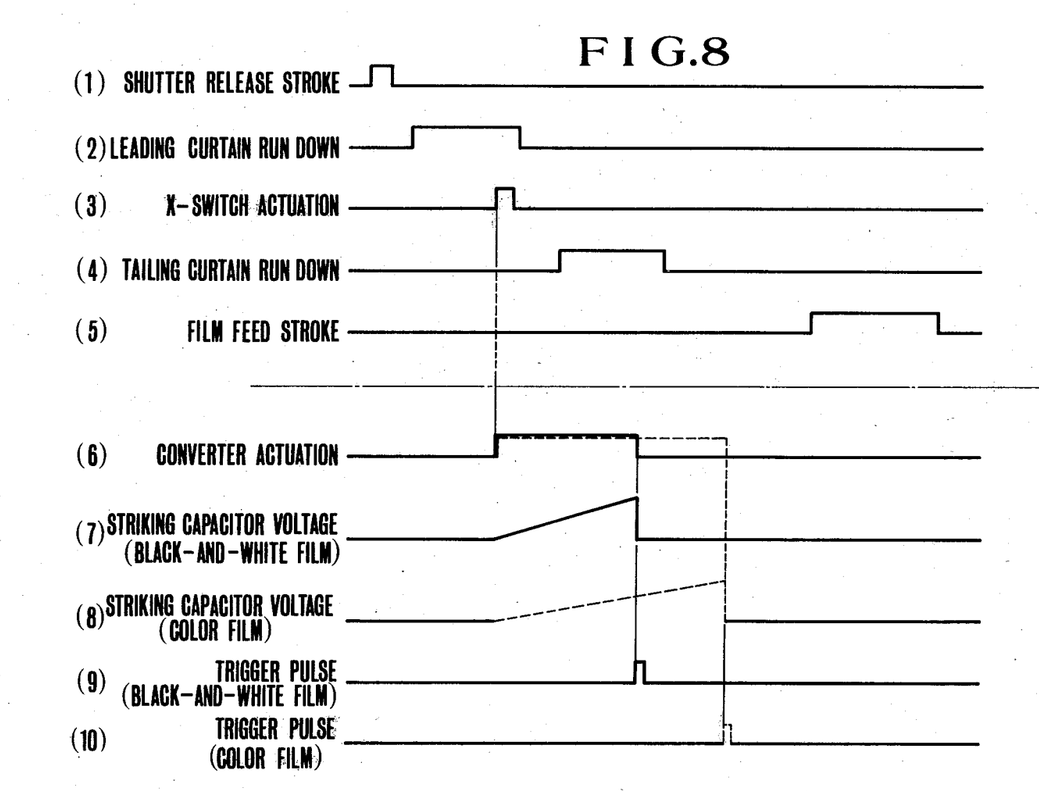
FIG. 8 is a timing chart of the voltages at various portions of the circuit of FIG. 7 at selected times with reference to the actuation of various parts of the camera of FIG. 1.

In operating the circuit of FIG. 7, when a shutter release button not shown of the camera is depressed through a length of stroke at a time shown on line (1) of the timing chart of FIG. 8, a front shutter curtain not shown begins to run down during an interval of time shown on line (2) of FIG. 8, near the terminal end of which the synchro-switch 201a is actuated for closure. When the synchro-switch 201a is closed, a trigger pulse is applied to the gating control electrode of the thyristor 205 from a capacitor 203 connected across the resistor 221 through the diode 204, thereby the thyristor 205 is rendered conducting. At this time, the battery 202 begins to charge the capacitor 206 and to operate with the converter in such a manner as described below. The conduction of the thyristor 205 causes flow of a base current through a transistor 207 to a resistor 208 so that a transient current flows from the collector electrode of the transistor 207 through a first primary coil 209a of an oscillation transformer 209 to the negative bus, resulting in a very high voltage on the secondary coil 209c which is then applied to a storage capacitor 212 through a diode 11 and also to a trigger capacitor 214 through the diode 11 and a resistor 213 connected in series with each other. On the other hand, the flow of the transient current causes flow of a current in a secondary primary coil 209 to charge a capacitor 210 connected between one end of the second primary coil 209 and the emitter electrode of transistor 207. When the voltage on the capacitor 210 has reached a predetermined level, the collector current of transistor 207 is rapidly decreased because of the application of an inverse bias voltage between the emitter and base electrodes thereof so that the transistor 207 is rendered non-conducting by the counter electromotive force of the first primary coil 209a to terminate a first cycle of oscillation of the converter. In a predetermined time interval, however, a base current is allowed again to flow from the transistor 207, thus initiating the second cycle of oscillation of the converter. As the converter oscillates in the above described manner, the voltage of the trigger capacitor 214 continues to increase as shown on line (7) of FIG. 8. When the voltage on the trigger capacitor 214 has reached a breakover voltage level of a disk 216 as predetermined by a variable resistor 215 connected across the trigger capacitor 214, the disk 216 is turned on to permit discharge of the trigger capacitor 214 through a primary coil of a trigger transformer 217, thereby the flash lamp 218 is striked to fire at a time shown on line (9) of FIG. 8 as the storage capacitor 212 is discharged through the flash lamp 218.

If the used film is of a lower sensitivity than that shown above, for example, of color, it is required to increase the amount of flash light energy available from the flash lamp 218 to effect equivalent results to the above. In this case, the variable resistor 215 may be re-adjusted so that the time interval during which the trigger capacitor 214 is charged is increased as shown on line (8) with increase in the amount of charge stored on the storage capacitor 212.

When the flash lamp 218 is fired, the load of the converter is instantaneously reduced to such a level that the thyristor 205 can not be maintained in the conducting state, and therefore, the converter is stopped from further oscillation at a time as shown on line (6) of FIG. 8. This time is adjusted so that the data exposure is terminated before the film transporting mechanism of the camera begins to operate as driven by a motor drive unit not shown.

A neon tube 220 is provided for indicating whether or not a data exposure has been made as connected in series with a resistor 219 and across the storage capacitor 212 to be lighted up at a point in time before the voltage on the storage capacitor 212 reaches the predetermined voltage level and to be lighted off when the flash lamp 218 has been fired. If the flash lamp 218 is hindered to fire by some unknown reasons, the neon tube 220 continues to light on for a longer period of time, for example, several seconds.

The circuit of FIG. 7 has many advantages. For example, as the flash lamp 218 is striked at a time just when the voltage on the storage capacitor has reached a previously adjusted level, the amount of flash light energy is maintained constant regardless of the level of consumption of the battery to make the data exposure in uniformity from frame to frame. Another advantage is that the data exposure value can be continuously varied depending upon the sensitivity of the used film. Another advantage is that premature consumption of energy of the battery can be prevented because the battery is rendered effective with the firing circuit only when the printing operation is performed.

In stead of using the synchro-switch provided in the camera as an initiating means for the firing of the flash lamp, a photovoltaic cell may be used as connected in the gate circuit of the thyristor 205 and arranged to receive light entering through the objective lens of the camera and the film.

What is claimed is:

1. A photographic data recording device for a camera for photographically recording some data on film together with a photographing image, the device comprising:

a capacitor;

electric charging means including a power source, a synchro-switch, which operates in correspondence with the shutter release, a converter and switching means connected between the converter and the power source, said switching means connecting the power source to the converter in correspondence with the closing of the synchro-switch to start electric charging;

electronic light flashing means which emits a flash of light in response to electric discharge by said capacitor to illuminate the data at an intensity corresponding to the electric charge potential of said capacitor; and controlling means which automatically causes said capacitor to discharge electricity so as to allow the electronic light flashing means to emit a flash of light when electric charge in the capacitor reaches a preset level of electric potential and which prevents the capacitor from discharging when the electric charge is below the preset level of potential.

2. A photographic data recording device for a camera for photographically recording some data on film together with a photographing image, the device comprising:

a capacitor;

means for charging said capacitor with electricity;

electronic light flashing means which emits a flash of light for illumination of said data in response to electric discharge of said capacitor;

trigger means for causing said capacitor to discharge electricity for allowing the electronic light flashing means to emit the flash of light in response to shutter release, the trigger means including a trigger capacitor;

a display lamp which lights up when the charged voltage of the capacitor reaches a preset value; and switching means for shifting said capacitor charging means between an operative position and an inoperative position, the switching means being arranged to form a closed circuit across said trigger capacitor and said display lamp to put out the display lamp when the switching means is at the inoperative position, said trigger capacitor being rendered incapable of causing the electronic light flashing means to emit a flash of light to prevent, irrespective of shutter release, the data from being illuminated by erroneous emission of a flash of light by the light flashing means in cases where the data are not required to be inserted into a photograph being taken.

* * * * *